UNITED STATES PATENT OFFICE.

KARL SCHOLZ, OF BERLIN, GERMANY, ASSIGNOR TO HEINRICH BYK, OF SAME PLACE.

OBTAINING PERMANENT HYDROQUINONE.

SPECIFICATION forming part of Letters Patent No. 427,620, dated May 13, 1890.

Application filed March 15, 1889. Renewed April 10, 1890. Serial No. 347,307. (No specimens.) Patented in England March 13, 1889, No. 4,404; in Belgium March 15, 1889, No. 85,239, and in France April 25, 1889, No. 196,439.

*To all whom it may concern:*

Be it known that I, KARL SCHOLZ, a subject of the German Emperor, residing at Berlin, Germany, have invented certain new and useful Improvements in Making Hydroquinone Durable or Permanent, (patented in France April 25, 1889, No. 196,439; in Belgium March 15, 1889, No, 85,239, and in Great Britain March 13, 1889, No. 4,404;) and I do hereby declare that the following is a full, clear, and exact description of the same.

Hydroquinone, which is much used in photography, possesses the disadvantage that it is not proof against the influence of the air and is easily decomposed, especially by the influence of dampness. For this reason the hydroquinone in the trade up to the present time presents usually a gray instead of a white color as a consequence of small black points which are formed in the decomposition of hydroquinone. This decomposition is still more prejudicial for the preservation of solutions of hydroquinone, as, not to speak of a loss of material, the whole solution may become useless and the pictures spoiled. To remedy this deficiency I have found that hydroquinone may be rendered proof against the influence of air and dampness by properly treating a solution of it with sulphuric acid. Out of the solution treated in this manner the hydroquinone is allowed to crystallize again. The crystals obtained by this process are well developed and have a citron-yellow color. They can be easily dried, are then air-proof, and are not affected by the influence of normal air-dampness, so that they can be preserved without entering into decomposition. The solutions prepared from these crystals are likewise durable or permanent by reason of their containing a slight quantity of sulphuric acid.

Having fully described my invention, what I claim as new, and desire to secure by Letters Patent, is—

The process of obtaining a permanent or durable hydroquinone in citron-yellow crystals by recrystallizing the ordinary hydroquinone from a solution in water or any other solution in the presence of sulphuric acid, substantially as described.

In witness whereof I have hereunto set my hand in presence of two witnesses.

KARL SCHOLZ.

Witnesses:
ALEX SCHOLZ,
B. ROI.